United States Patent
Akeyama

(10) Patent No.: US 9,968,907 B2
(45) Date of Patent: May 15, 2018

(54) GAS ADSORBENT AND VACUUM THERMAL INSULATION MATERIAL INCLUDING GAS ADSORBENT

(71) Applicant: Panasonic Intellectual Property Management Co., Ltd., Osaka (JP)

(72) Inventor: Yukako Akeyama, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/504,757

(22) PCT Filed: Aug. 25, 2016

(86) PCT No.: PCT/JP2016/003869
§ 371 (c)(1),
(2) Date: Feb. 17, 2017

(87) PCT Pub. No.: WO2017/038058
PCT Pub. Date: Mar. 9, 2017

(65) Prior Publication Data
US 2017/0274349 A1   Sep. 28, 2017

(30) Foreign Application Priority Data
Sep. 3, 2015 (JP) .................. 2015-173726

(51) Int. Cl.
*B01D 53/02* (2006.01)
*B01J 20/18* (2006.01)
(Continued)

(52) U.S. Cl.
CPC .............. *B01J 20/18* (2013.01); *B01D 53/02* (2013.01); *B01J 20/28* (2013.01); *C01B 39/38* (2013.01);
(Continued)

(58) Field of Classification Search
None
See application file for complete search history.

(56) References Cited

U.S. PATENT DOCUMENTS 4,091,007 A * 5/1978 Dwyer .................... B01J 29/40
   423/705
5,544,490 A   8/1996 Manini et al.
(Continued)

FOREIGN PATENT DOCUMENTS

EP   2676714 A1   12/2013
JP   62-138321 A   6/1987
(Continued)

OTHER PUBLICATIONS

International Search Report and Written Opinion dated Jan. 11, 2016, issued in International Application No. PCT/JP2016/003869. (w/ partial English translation).
(Continued)

*Primary Examiner* — Colin W. Slifka
(74) *Attorney, Agent, or Firm* — McDermott Will & Emery LLP

(57) ABSTRACT

A gas adsorbent includes copper-exchanged ZSM-5 zeolite, and the crystallinity of the copper-exchanged ZSM-5 zeolite is set to at least 40% and up to 80%.

10 Claims, 4 Drawing Sheets

(51) Int. Cl.
*B01J 20/28* (2006.01)
*C01B 39/38* (2006.01)
*F16L 59/065* (2006.01)

(52) U.S. Cl.
CPC ........ *F16L 59/065* (2013.01); *B01D 2257/10* (2013.01)

(56) References Cited

U.S. PATENT DOCUMENTS

| | | |
|---|---|---|
| 5,600,957 A | 2/1997 | Manini et al. |
| 2016/0136612 A1 | 5/2016 | Sato et al. |

FOREIGN PATENT DOCUMENTS

| | | |
|---|---|---|
| JP | 9-512088 A | 12/1997 |
| JP | 2005-015267 A | 1/2005 |
| JP | 2006-043604 A | 2/2006 |
| JP | 2008-093632 A | 4/2008 |
| JP | 2008-208844 A | 9/2008 |
| JP | 2009-090207 A | 4/2009 |
| JP | 2016-101574 A | 6/2016 |

OTHER PUBLICATIONS

The Extended European Search Report dated Nov. 7, 2017 for the related European Patent Application No. 16836044.4.

\* cited by examiner

GAS ADSORBENT AND VACUUM THERMAL INSULATION MATERIAL INCLUDING GAS ADSORBENT

RELATED APPLICATIONS

This application is a U.S. national stage application of the PCT International Application No. PCT/JP2016/003869 filed on Aug. 25, 2016, which claims the benefit of foreign priority of Japanese patent application 2015-173726 filed on Sep. 3, 2015, the contents all of which are incorporated herein by reference

TECHNICAL FIELD

The present invention relates to a gas adsorbent that can adsorb gas in a pressure range not higher than atmospheric pressure, and a vacuum thermal insulation material including the gas adsorbent.

BACKGROUND ART

Energy saving is desired in view of the importance of preventing the global warming, generating a demand for a thermal insulation material having good thermal insulation properties as one means for energy saving.

A vacuum thermal insulation material, which has good thermal insulation properties among thermal insulation materials, has a wide range of application and is therefore required to exhibit further improved properties.

The vacuum thermal insulation material exhibits good thermal insulation properties by eliminating as much gas that transmits heat as possible so that heat transfer through gas is reduced. In order to improve the thermal insulation properties of the vacuum thermal insulation material, it is necessary to reduce the internal pressure of the vacuum thermal insulation material to suppress the heat transfer through gas which is due to collision of molecules.

However, the practically reachable degree of vacuum at the industrial level is approximately 10 Pa, and gas generated inside the vacuum thermal insulation material and an invasive gas component that enters the vacuum thermal insulation material from outside by permeation with time, for example, also cause temporal degradation of the thermal insulation properties. Therefore, there is a demand for a gas adsorbent that can adsorb gas in a pressure range not higher than atmospheric pressure.

Such gas adsorption is required to be irreversible; therefore, physical adsorption is unsuitable and chemical adsorption, which forms stronger bond, is desirable. Nitrogen, which makes up 80% of the air, however, has a stable triple bond, making the chemical adsorption very difficult.

Examples of an alloy that adsorbs such nitrogen, especially, an alloy that removes such nitrogen at low temperature, include a Ba—Li alloy (for example, see Patent Literature (PTL) 1).

The Ba—Li alloy is used as a device for maintaining vacuum in a thermally insulating jacket together with a drying material and shows high reactivity towards gas such as nitrogen even at room temperature.

Ba used in a conventional adsorbent in PTL 1, however, is a substance designated by the pollutant release and transfer register (PRTR), and therefore, for the purpose of industrial use, it is necessary to make Ba absorbable by a substance that poses no problem for the environment and human bodies. There is also the problem that, in order to expand the application of the vacuum thermal insulation material, the vacuum thermal insulation material is required to be able to adsorb an increased volume of nitrogen.

CITATION LIST

Patent Literature

PTL 1: Japanese Translation of PCT Publication No. H09-512088

SUMMARY OF THE INVENTION

The present invention is conceived in view of conventional problems such as those described above and has an object to provide a gas adsorbent that can adsorb a large volume of gas even in a pressure range not higher than atmospheric pressure.

Furthermore, the present invention provides a vacuum thermal insulation material that can maintain thermal insulation properties over a long period of time as a result of including a gas adsorbent that can adsorb a large volume of gas even in a pressure range not higher than atmospheric pressure.

Specifically, the gas adsorbent according to an exemplary embodiment of the present invention includes copper-exchanged ZSM-5 zeolite, and crystallinity of the copper-exchanged ZSM-5 zeolite is set to at least 40% and up to 80%.

With this configuration, copper-exchanged ZSM-5 zeolite having crystallinity in the above range includes an increased number of nitrogen adsorption sites, and thus it is possible to obtain a gas adsorbent that can adsorb a large volume of gas. Furthermore, with this configuration, the gas adsorbent according to the exemplary embodiment of the present invention is environmentally friendly without containing the substances designated by the PRTR.

Furthermore, the crystallinity of the copper-exchanged ZSM-5 zeolite in the gas adsorbent according to an exemplary embodiment of the present invention may be set to at least 50% and up to 75%. With this configuration, a large amount of copper is introduced into ZSM-5 zeolite, and a large number of nitrogen adsorption sites are present, thus leading to high nitrogen adsorption properties.

Furthermore, in the gas adsorbent according to an exemplary embodiment of the present invention, the crystallinity of the copper-exchanged ZSM-5 zeolite and the crystallinity of Na—, H—, or NH4-ZSM-5 zeolite having a Si/Al ratio substantially equal to the Si/Al ratio of the copper-exchanged ZSM-5 zeolite may be calculated as follows. Specifically, the calculation may be performed using a ratio of the highest peak intensity of the copper-exchanged ZSM-5 zeolite to the highest peak intensity of Na—, H—, or NH4-ZSM-5 zeolite having a Si/Al ratio substantially equal to the Si/Al ratio of the copper-exchanged ZSM-5 zeolite, where the highest peak intensity of the Na—, H—, or NH4-ZSM-5 zeolite having the Si/Al ratio substantially equal to the Si/Al ratio of the copper-exchanged ZSM-5 zeolite is defined as 100%, on the condition that the highest peak intensity is intensity of a peak having the highest intensity among peaks detected at $2\theta=22.8°$ to $23.8°$ in X-ray diffraction of each of the copper-exchanged ZSM-5 zeolite and the Na—, H—, or NH4-ZSM-5 zeolite having the Si/Al ratio substantially equal to the Si/Al ratio of the copper-exchanged ZSM-5 zeolite. With such a method, the crystallinity can be obtained with increased ease and convenience.

Furthermore, the Si/Al ratio of the copper-exchanged ZSM-5 zeolite in the gas adsorbent according to an exemplary embodiment of the present invention may be set to at least 8 and less than 25. In the copper-exchanged ZSM-5 zeolite, copper ions are exchanged first as $Cu^{2+}$. Subsequently, appropriate heat treatment is performed under reduced pressure so that $Cu^{2+}$ is reduced to $Cu^+$, and thus nitrogen adsorption activity is exhibited. Accordingly, when the Si/Al ratio is low, that is, when minus monovalent Al is large in number, copper is more stable with $Cu^{2+}$, and the heat treatment reduces the number of sites that are reduced to $Cu^+$. Thus, the nitrogen adsorption activity is decreased. On the other hand, when the Si/Al ratio is high, that is, when minus monovalent Al is small in number, the amount of copper that is introduced by the ion exchange is small, and the number of $Cu^+$ sites is small. Thus, the nitrogen adsorption activity is decreased in this case as well. Therefore, as a result of the Si/Al ratio of the copper-exchanged ZSM-5 zeolite being set to at least 8 and less than 25, it is possible to obtain good nitrogen adsorption properties.

Furthermore, the copper exchange rate of the copper-exchanged ZSM-5 zeolite in the gas adsorbent according to an exemplary embodiment of the present invention may be set to at least 130% and less than 200%. When the copper ion exchange rate is less than 130%, copper ions are insufficient for adsorption of a large volume of gas because the nitrogen adsorption active site of the copper-exchanged ZSM-5 zeolite is a copper ion. The case where the copper ion exchange rate is 200% is a case where copper completely replaces cations that are present before the copper exchange, meaning that the copper ion exchange rate does not exceed 200% except in a peculiar case. Thus, when the Si/Al ratio is at least 8 and less than 25, good nitrogen adsorption properties are obtained.

Furthermore, the vacuum thermal insulation material according to an exemplary embodiment of the present invention includes at least an outer coating, a core, and a gas adsorbent that is the gas adsorbent according to one of the above exemplary embodiments. With this configuration, even when gas enters the vacuum thermal insulation material from outside, the gas adsorbent adsorbs a large volume of gas, and thus it is possible to suppress changes in internal pressure and suppress changes in thermal insulation properties over a long period of time. Accordingly, a vacuum thermal insulation material having improved durability can be obtained.

DESCRIPTION OF EMBODIMENTS

Figure 1:
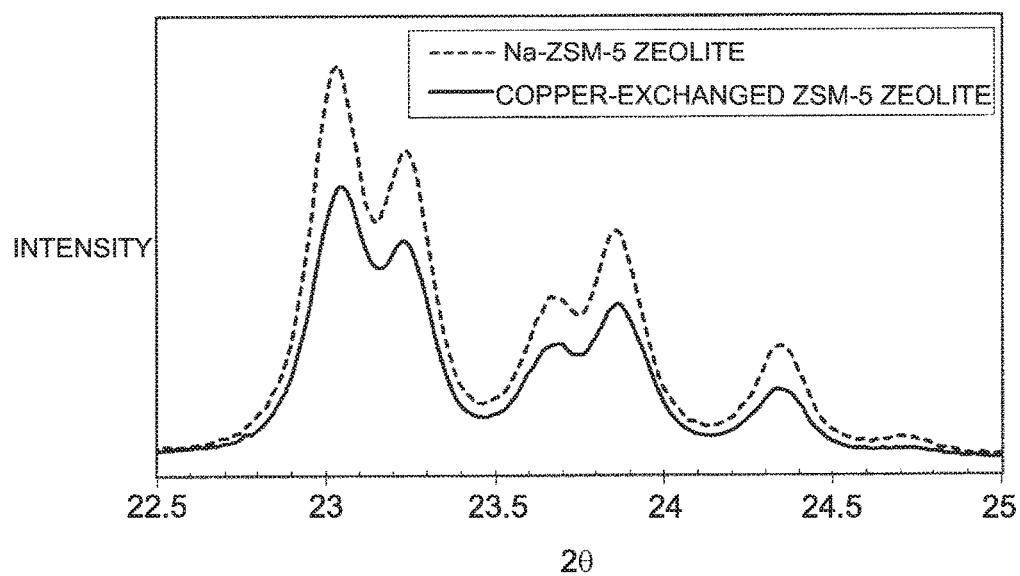
FIG. 1 shows X-ray diffraction data of copper-exchanged ZSM-5 zeolite and Na-ZSM-5 zeolite having a Si/Al ratio substantially equal to the Si/Al ratio of the copper-exchanged ZSM-5 zeolite according to exemplary embodiment 1 of the present invention.

Hereinafter, exemplary embodiments of the present invention will be described with reference to the drawings. Note that the present invention is not limited to these exemplary embodiments.

Exemplary Embodiment 1

A gas adsorbent according to exemplary embodiment 1 of the present invention includes copper-exchanged ZSM-5 zeolite. In the chemical structure of ZSM-5 zeolite, oxygen (O) binds silicon (Si) and aluminum (Al) together. In the skeletal structure of ZSM-5 zeolite, Al (plus trivalent) and Si (plus quadrivalent) share O (minus bivalent), and therefore the surrounding of Si is electrically neutral while the surrounding of Al is minus monovalent. A cation is necessary in the skeleton to compensate for this negative charge.

The crystallinity of ZSM-5 zeolite before copper exchange is lowered to break the Si—O—Al bond, causing a decrease in the Si/Al ratio.

This results in the need for a large number of cations which are required to maintain electroneutrality, causing an increase in the amount of copper that is introduced into the ZSM-5 zeolite. Consequently, the number of nitrogen adsorption sites increases, thereby improving the nitrogen adsorption properties. However, if the crystallinity is excessively lowered, the skeletal structure of the ZSM-5 zeolite will be excessively broken.

The gas adsorbent according to exemplary embodiment 1 of the present invention will be described below. The gas adsorbent according to exemplary embodiment 1 of the present invention is produced with the following processes.

First, copper-exchanged ZSM-5 zeolite is produced through the steps of adjusting the crystallinity of Na—, H—, or NH4-ZSM-5 zeolite; introducing copper ions into the ZSM-5 zeolite having the adjusted crystallinity (copper ion exchange); washing the ZSM-5 zeolite with water; and drying the ZSM-5 zeolite to remove water remaining on the surface of the ZSM-5 zeolite. Next, heat treatment is performed on the ZSM-5 zeolite under reduced pressure so that introduced $Cu^{2+}$ is reduced to $Cu^+$ and nitrogen adsorption properties are exhibited, resulting in a gas adsorbent.

Note that the starting material is not particularly limited to Na-ZSM-5 zeolite, H-ZSM-5 zeolite, and NH4-ZSM-5 zeolite which have different cations in pores.

The method of adjusting crystallinity is not particularly limited and is, for example, acid treatment, alkali treatment, or heat treatment under high temperature and high humidity conditions.

In the case of the acid treatment, it is possible to use a known material such as acetic acid, nitric acid, sulfuric acid, or acetic acid. In the case of the alkali treatment, it is possible to use a known material such as sodium hydroxide, potassium hydroxide, sodium silicate, sodium aluminate, or ammonia. The method of such treatment is not particularly limited either and can be, for example, a known method such as immersing in a solution.

The heat treatment under high temperature and high humidity conditions is not particularly limited either and can be, for example, a known method such as heating while circulating steam or heating in water in a container with high internal pressure.

Note that the timing of adjusting crystallinity is not particularly limited, but the crystallinity is desirably adjusted before copper exchange because copper drawn into the zeolite skeleton may flow out if the crystallinity is adjusted after copper exchange.

As the method of measuring crystallinity, it is possible to use a known method; for example, the X-ray diffraction can be used to determine crystallinity.

FIG. 1 shows X-ray diffraction data of copper-exchanged ZSM-5 zeolite and Na-ZSM-5 zeolite having a Si/Al ratio substantially equal to the Si/Al ratio of the copper-exchanged ZSM-5 zeolite according to exemplary embodiment 1 of the present invention.

Note that ZSM-5 zeolite used in analysis according to the present exemplary embodiment has a Si/Al ratio of 14.5.

In the X-ray diffraction shown in FIG. 1, both the materials have three peaks in the range of $2\theta=22.8°$ to $23.8°$, among which the peak at $2\theta=23°$ has the highest intensity.

Using the intensity of this peak having the highest intensity, the crystallinity is calculated according to mathematical expression [Math.] 1.

$$\text{Crystallinity (\%)} = \frac{\text{Peak intenstiy of the copper-exchanged ZSM-5 zeolite}}{\text{Peak intensity of Na}^-, \text{H}^-, \text{or NH4-ZSM-5 zeolite}} \quad [\text{Math. 1}]$$

Note that the crystallinity of another copper-exchanged ZSM-5 zeolite (which may be the copper-exchanged ZSM-5 zeolite after exhibiting its adsorption ability) can also be measured by a known method, and the crystallinity can be verified according to the procedure below, for example.

First, another copper-exchanged ZSM-5 zeolite is dissolved in concentrated nitric acid and hydrofluoric acid. Next, the quantity of each of Si, Al, Cu, and Na is determined through high-frequency inductively coupled plasma (ICP) analysis, and the mole ratio of each of Si, Al, Cu, and Na is calculated. Using the obtained mole ratio, the Si/Al ratio can be determined according to mathematical expression [Math.] 2.

$$\text{Si/Al ratio} = \frac{\text{Mole ratio of Si}}{\text{Mole ratio of Al}} \times 100 \quad [\text{Math. 2}]$$

Next, Na—, H—, or NH4-ZSM-5 zeolite having a Si/Al ratio substantially equal to the determined Si/Al ratio is prepared.

Using the prepared Na—, H—, or NH4-ZSM-5 zeolite as a blank (a reference sample for comparison), the crystallinity is calculated according to mathematical expression [Math.] 1.

$$\text{Crystallinity (\%)} = \frac{\text{Peak intenstiy of the copper-exchanged ZSM-5 zeolite}}{\text{Peak intensity of Na}^-, \text{H}^-, \text{or NH4-ZSM-5 zeolite}} \quad [\text{Math. 1}]$$

As the copper-exchanged ZSM-5 zeolite according to the present exemplary embodiment, ZSM-5 zeolite including copper drawn into pores as cations is used. The copper ion exchange can be performed by a known method.

Generally, the copper ion exchange is performed by a method of immersing a sample in an aqueous copper chloride solution or an aqueous soluble copper salt solution such as an aqueous ammine acid copper solution, for example. A sample adjusted by, among the common methods, a method in which a carboxylate-containing $Cu^{2+}$ solution such as a copper (II) propionate or copper (II) acetate solution is used has good nitrogen adsorption properties.

The gas adsorbent is produced by performing heat treatment on copper-exchanged ZSM-5 zeolite under reduced pressure. This treatment is necessary to reduce $Cu^{2+}$ introduced by the ion exchange to $Cu^+$ and exhibit nitrogen adsorption properties.

The pressure upon the heat treatment is desirably 10 mPa or less and more desirably 1 mPa or less. The heat treatment temperature is required to be at least 300° C. in order to promote the reduction to $Cu^+$ and is desirably in the range of about 500° C. to 700° C. because zeolite will be degraded if the temperature is too high.

As the method of evaluating the Si/Al ratio and the copper exchange rate, it is possible to use a known method; for example, the ICP analysis can be used. Specifically, first, copper-exchanged ZSM-5 zeolite is dissolved in concentrated nitric acid and hydrofluoric acid. Next, the quantity of each of Si, Al, and Cu is determined through the ICP analysis, and the mole ratio of each of Si, Al, and Cu is calculated. Using the obtained mole ratio, the Si/Al ratio can be determined according to mathematical expression [Math.] 2.

$$\text{Si/Al ratio} = \frac{\text{Mole ratio of Si}}{\text{Mole ratio of Al}} \times 100 \quad [\text{Math. 2}]$$

The copper exchange rate can be determined according to mathematical expression [Math.] 3.

$$\text{Copper exchange rate (\%)} = \frac{\text{Mole ratio of Cu} \times 2}{\text{Mole ratio of Al}} \times 100 \quad [\text{Math. 3}]$$

The gas adsorbent according to the present exemplary embodiment will be described below in greater detail using working examples.

Working Example 1

In working example 1, Na-ZSM-5 zeolite having a Si/Al ratio of 14.5 is used. The crystallinity of the Na-ZSM-5 zeolite having a Si/Al ratio of 14.5 is adjusted, then the copper ion exchange is performed, and thus copper-exchanged ZSM-5 zeolite is produced.

Figure 2:
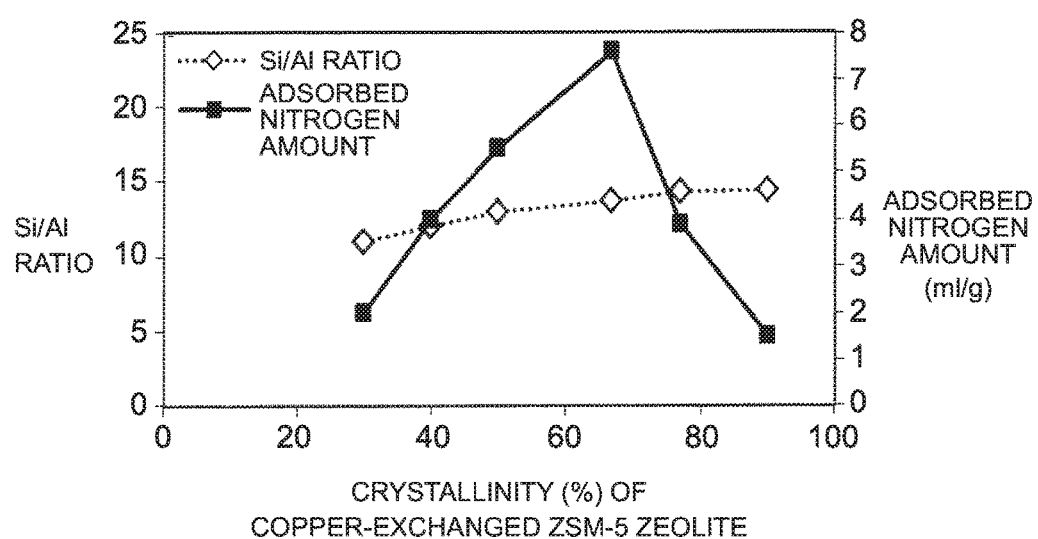
FIG. 2 shows the relationship between the crystallinity, the Si/Al ratio, and the adsorbed nitrogen amount of copper-exchanged ZSM-5 zeolite according to exemplary embodiment 1 of the present invention.
Figure 3:
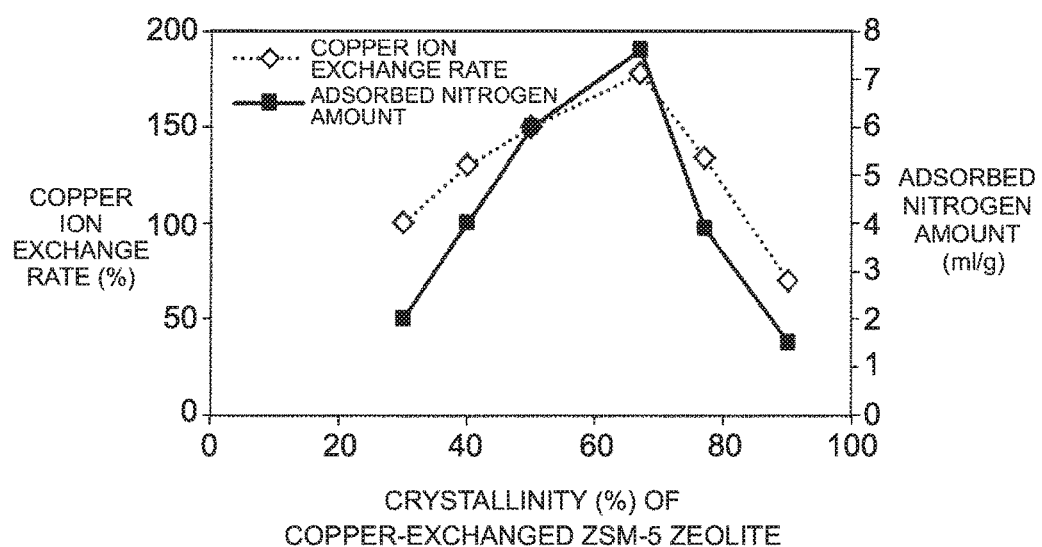
FIG. 3 shows the relationship between the crystallinity, the copper ion exchange rate, and the adsorbed nitrogen amount of copper-exchanged ZSM-5 zeolite according to exemplary embodiment 1 of the present invention.

FIG. 2 shows the relationship between the crystallinity, the Si/Al ratio, and the adsorbed nitrogen amount of the copper-exchanged ZSM-5 zeolite according to exemplary embodiment 1 of the present invention. FIG. 3 shows the relationship between the crystallinity, the copper ion exchange rate, and the adsorbed nitrogen amount of the copper-exchanged ZSM-5 zeolite according to exemplary embodiment 1 of the present invention. Note that the adsorbed nitrogen amounts in FIG. 2 and FIG. 3 are each an amount of nitrogen adsorbed under an equilibrium adsorption pressure of 10 Pa.

FIG. 2 shows that the Si/Al ratio decreases as the crystallinity decreases. FIG. 3 shows that the copper ion exchange rate has a local maximum with respect to the crystallinity. The figures also show that the adsorbed nitrogen amount is correlated with the crystallinity, the Si/Al ratio, and the copper ion exchange rate.

Note that the adsorbed nitrogen amount under an equilibrium adsorption pressure of 10 Pa needs to be at least 4 ml/g and is more desirably 5 ml/g because a vacuum thermal insulation material for an application that requires long lasting thermal insulation, such as a building material, is required to have durability of at least 30 years.

Therefore, as shown in FIG. 2 and FIG. 3, in order to obtain good nitrogen adsorption properties, the crystallinity is desirably at least 40% and up to 80% and more desirably at least 50% and up to 75%, and the copper ion exchange rate is desirably at least 130% and up to 200%.

As described above, if the crystallinity of ZSM-5 zeolite is excessively lowered, the skeletal structure of the ZSM-5 zeolite will be excessively broken, and therefore, the crystallinity is desirably in the range of from 40% to 80%. With the crystallinity in this range, good nitrogen adsorption properties are obtained.

Note that the copper-exchanged ZSM-5 zeolite according to the present exemplary embodiment exhibits good adsorption properties with respect to especially nitrogen, but is also able to adsorb oxygen, hydrogen, water, carbon monoxide, and the like, aside from nitrogen.

Note that the adsorption properties of the copper exchanged ZSM-5 produced through the process of lowering the crystallinity of Na—, H—, or NH4-ZSM-5 zeolite, such as the gas adsorbent according to the present exemplary embodiment, are compared with the adsorption properties of copper-exchanged ZSM-5 zeolite produced using Na—, H—, or NH4-ZSM-5 zeolite having a Si/Al ratio substantially equal to the Si/Al ratio of the copper-exchanged ZSM-5 zeolite without the process of lowering the crystallinity, and this comparison shows that the adsorption properties of the former are better than the adsorption properties of the latter.

The mechanism for this has not been elucidated, but this is considered to be due to the ZSM-5 zeolite according to the present exemplary embodiment with the Si/Al ratio lowered on a portion close to a surface (a site that can be easily exchanged with copper) with improved efficiency because the pore distribution and the specific surface area of the ZSM-5 zeolite change by the process of lowering the crystallinity. As a result, it is inferred that an increased amount of copper is introduced, improving the adsorption properties.

Furthermore, the copper-exchanged ZSM-5 zeolite is environmentally friendly without containing the substances designated by the PRTR.

Working Example 2

In working example 2, more than one Na-ZSM-5 zeolite having a Si/Al ratio different from that in working example 1 is used, and an experiment that is the same as or similar to that in working example 1 is conducted.

Figure 4:
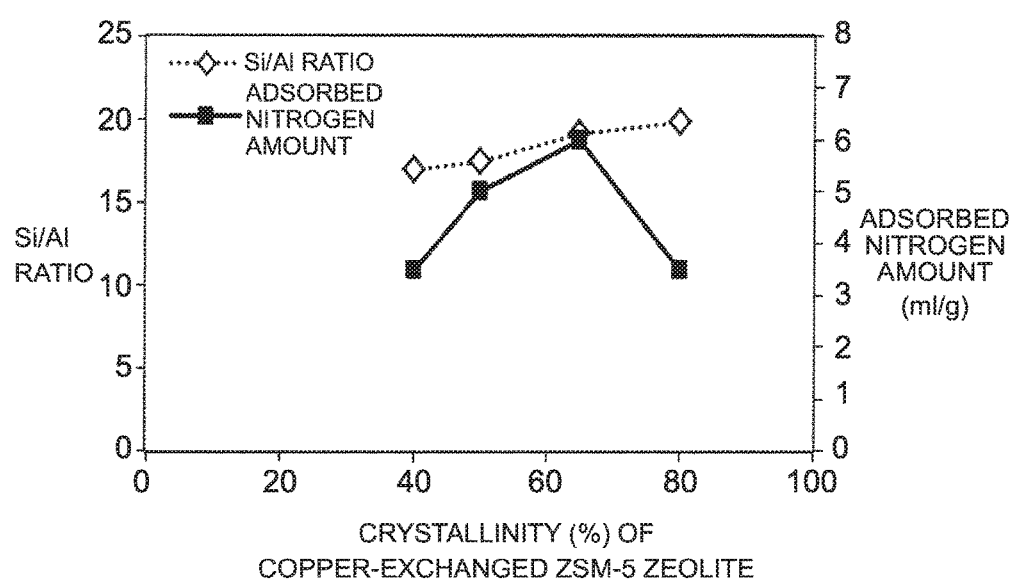
FIG. 4 shows the relationship between the crystallinity, the Si/Al ratio, and the adsorbed nitrogen amount of another copper-exchanged ZSM-5 zeolite according to exemplary embodiment 1 of the present invention.
Figure 5:
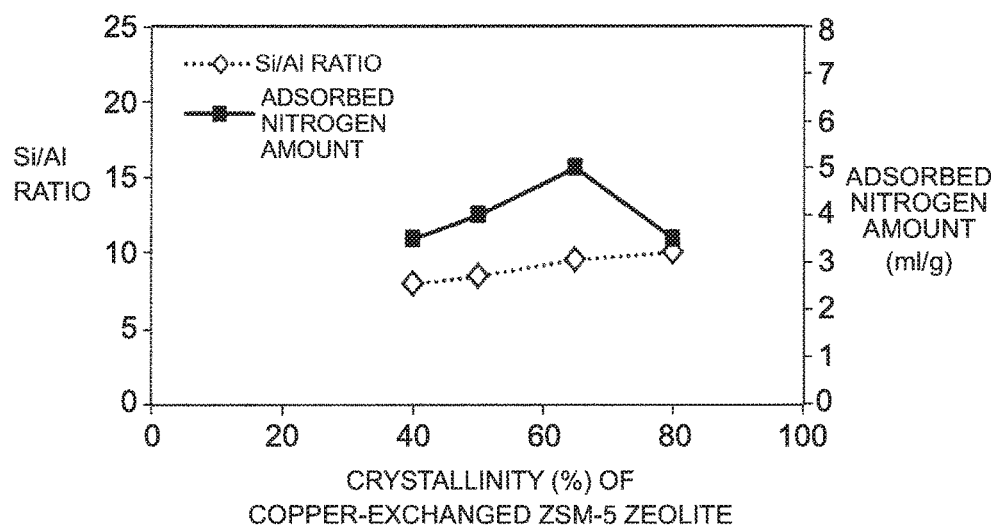
FIG. 5 shows the relationship between the crystallinity, the Si/Al ratio, and the adsorbed nitrogen amount of yet another copper-exchanged ZSM-5 zeolite according to exemplary embodiment 1 of the present invention.

FIG. 4 shows the relationship between the crystallinity, the Si/Al ratio, and the adsorbed nitrogen amount of another copper-exchanged ZSM-5 zeolite according to exemplary embodiment 1 of the present invention. FIG. 5 shows the relationship between the crystallinity, the Si/Al ratio, and the adsorbed nitrogen amount of yet another copper-exchanged ZSM-5 zeolite according to exemplary embodiment 1 of the present invention.

FIG. 4 shows that the adsorbed nitrogen amount of the copper-exchanged ZSM-5 zeolite produced using Na-ZSM-5 zeolite having a Si/Al ratio of 19.0 has a local maximum (approximately 6 ml/g). FIG. 5 shows that the adsorbed nitrogen amount of the copper-exchanged ZSM-5 zeolite produced using Na-ZSM-5 zeolite having a Si/Al ratio of 10.0 has a local maximum (approximately 5 ml/g).

Figure 6:
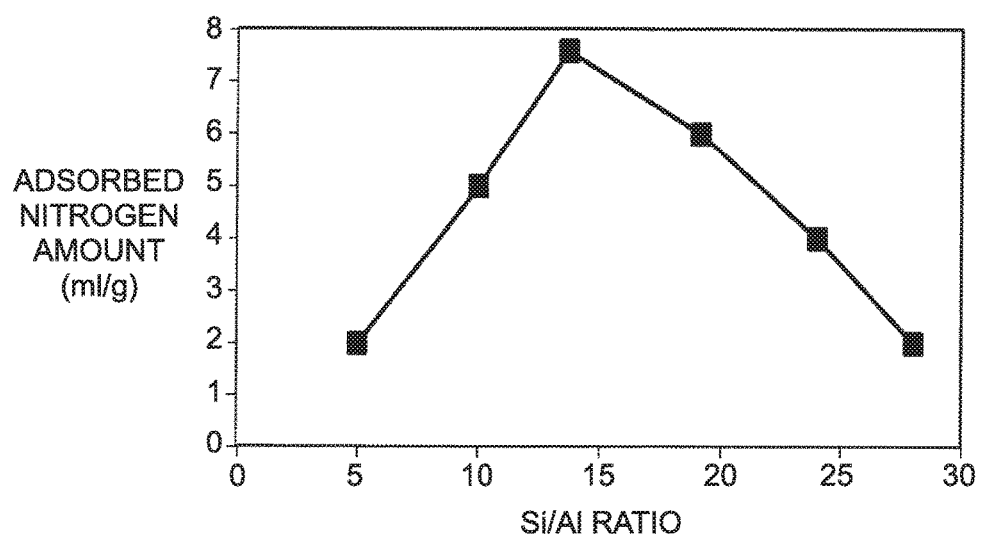
FIG. 6 shows the relationship between the Si/Al ratio and the adsorbed nitrogen amount, of the case where the adsorbed nitrogen amount has a local maximum, of copper-exchanged ZSM-5 zeolite produced using Na-ZSM-5 zeolite having a different Si/Al ratio according to exemplary embodiment 1 of the present invention.

FIG. 6 shows the relationship between the Si/Al ratio and the adsorbed nitrogen amount, of the case where the adsorbed nitrogen amount has a local maximum, of the copper-exchanged ZSM-5 zeolite produced using Na-ZSM-5 zeolite having a different Si/Al ratio according to exemplary embodiment 1 of the present invention. Specifically, FIG. 6 shows the relationship between the Si/Al ratios and the adsorbed nitrogen amounts of the case where the adsorbed nitrogen amounts shown in FIG. 2, FIG. 4, and FIG. 5 have local maxima, and the relationship between three Si/Al ratios different from the Si/Al ratios shown in FIG. 2, FIG. 4, and FIG. 5 and the adsorbed nitrogen amounts.

As shown in FIG. 6, in order to obtain good nitrogen adsorption properties, the Si/Al ratio is desirably at least 8 and less than 25 and more desirably at least 10 and up to 20.

Exemplary Embodiment 2

Figure 7:
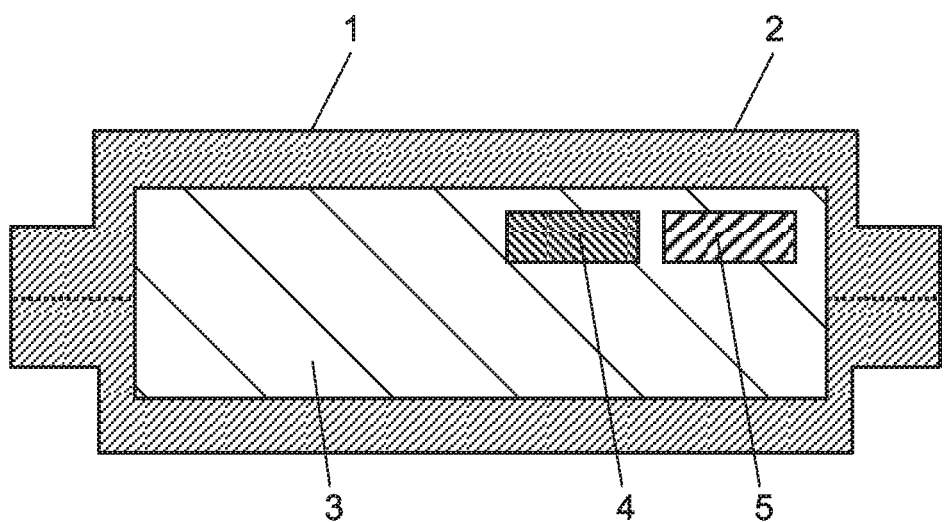
FIG. 7 is a cross-sectional view of a vacuum thermal insulation material according to exemplary embodiment 2 of the present invention.

FIG. 7 is a cross-sectional view of a vacuum thermal insulation material according to exemplary embodiment 2 of the present invention.

In FIG. 7, vacuum thermal insulation material 1 includes outer coating 2, core 3, moisture adsorbent 4, and gas adsorbent 5 described in exemplary embodiment 1.

In vacuum thermal insulation material 1, core 3 is provided inside outer coating 2. Moisture adsorbent 4 and gas adsorbent 5 are provided in portions of core 3, and the inside of outer coating 2 is sealed under reduced pressure.

Next, a method of manufacturing vacuum thermal insulation material 1 will be described. First, as outer coating 2, a laminate film is cut into two rectangular laminate films of the same size, and the two laminate films are welded together on three sides with thermal welding layers facing each other into the shape of a bag. Next, core 3, inside of which moisture adsorbent 4 and gas adsorbent 5 are provided, is inserted through an opening of outer coating 2 sealed on the three sides. This is placed inside a vacuum chamber of a vacuum packaging machine, then the pressure inside the vacuum chamber is reduced to a predetermined pressure, and the opening is welded; in this way, vacuum thermal insulation material 1 is produced.

Note that as outer coating 2 according to the present exemplary embodiment, it is possible to use a plastic container, a metal container, a laminate film, or the like which has barrier properties and separates the internal space from the external space of vacuum thermal insulation material 1, but outer coating 2 is not particularly limited to these examples.

For example, in the case where a laminate film is used as outer coating 2, the configuration of the laminate film is not particularly limited, and it is possible to use materials such as those cited below. Specifically, as the innermost thermal welding layer, it is possible to use low-density polyethylene, linear low-density polyethylene, high-density polyethylene, unstretched polypropylene, polyacrylonitrile, unstretched polyethylene terephthalate, unstretched nylon, unstretched ethylene-polyvinyl alcohol copolymer resin, or the like, but the innermost thermal welding layer is not particularly limited to these examples.

Furthermore, in order to suppress gas entry from outside, it is possible to use a metal foil, an evaporated film, a coating film, or the like. The type and the number of layers of these examples are not particularly limited. Although Al, stainless steel, iron, a mixture of these, or the like is used as the metal foil, the metal foil is not particularly limited to these examples. Polyethylene terephthalate, ethylene-polyvinyl alcohol copolymer resin, polyethylene naphthalate, nylon, polypropylene, polyamide, polyimide, or the like is used as a material of a plastic film that serves as a base for evaporation, coating, or the like, but the material of the plastic film is not particularly limited to these examples. Although Al, cobalt, nickel, zinc, copper, silver, Si/Al, diamond-like carbon, a mixture of these, or the like is used as a material for the evaporation, the material for the evaporation is not particularly limited to these examples. Although polyvinyl acetate (PVA), polyacrylic-based resin, a mixture of these, or the like is used as a material for the coating, the material for the coating is not particularly limited to these examples.

Furthermore, it is also possible to additionally provide a film on an outer layer or an intermediate layer for the purposes of improving the resistance to pinholes and abrasion, providing flame retardant properties, further improving the barrier properties, and the like.

Although nylon, ethylene-tetrafluoroethylene copolymer resin, polyethylene terephthalate, polyethylene naphthalate, polypropylene, ethylene-polyvinyl alcohol copolymer resin, or the like is used as the film provided on the outer layer or the intermediate layer, the type and the number of layers of these examples are not particularly limited.

In vacuum thermal insulation material 1 according to the present exemplary embodiment, core 3 is for maintaining the shape of vacuum thermal insulation material 1 by resisting contraction under atmospheric pressure; fibers, powders, foamed resin, a porous substance, a thin-film laminate, or the like with high porosity is used as core 3, but core 3 is not particularly limited to these examples. For example, glass wool, glass fibers, alumina fibers, silica-alumina fibers, silica fibers, rock wool, silicon carbide fibers, or the like is used as the fibers. Silica, pearlite, carbon black, or the like is used as the powders. Urethane foam, phenol foam, styrene foam, or the like is used as the foamed resin. It is also possible to use a mixture or compact of these examples.

In the case where a material or configuration insusceptible to deformation under atmospheric pressure is used as outer coating 2, vacuum thermal insulation material 1 can be configured without core 3.

Regarding the issue that vacuum thermal insulation material 1 according to the present exemplary embodiment includes at least gas adsorbent 5 described in the above exemplary embodiment, it is also possible to use moisture adsorbent 4 in addition to gas adsorbent 5. As the moisture adsorbent, which adsorbs moisture contained in gas, activated carbon, silica gel, calcium oxide, or the like is used, but the moisture adsorbent is not particularly limited to these examples. Examples of the shape of the moisture adsorbent include a granular form and a pellet form, but the shape of the moisture adsorbent is not particularly limited to these examples. When the moisture adsorbent is in powder form, it is possible to adsorb surrounding moisture with increased speed because the surface area of the moisture adsorbent per unit weight is large, and thus, the shape of the moisture adsorbent is more desirably a powder form.

Gas adsorbent 5 is desirably used in the state of being housed in a container made of a low gas permeable material (that is, used as a device) in order to suppress deactivation that is due to gas adsorption before vacuum sealing. The form of the gas adsorbent as a device is not particularly limited, and an example of the form is as follows: copper-exchanged ZSM-5 zeolite is housed in a metal or glass container having an opening, thereafter heat treatment is performed under reduced pressure to induce activation, and the container is hermetically sealed.

When the gas adsorbent is provided in vacuum thermal insulation material 1, the gas adsorbent is desirably in the form of a device. For example, the gas adsorbent is desirably openable inside vacuum thermal insulation material 1 after manufacture thereof in order to suppress deactivation that is due to contact with gas. It is desirable to use a gas adsorbent, for example, configured so that the amount of gas entry into the device is reduced to a maximum extent to reduce the amount of deactivation that is due to gas adsorption before vacuum sealing and eliminate the need to open the gas adsorbent inside vacuum thermal insulation material 1.

Regarding the thermal insulation properties of vacuum thermal insulation material 1 produced as described above, working examples will be described.

Working Example 3

In working example 3, the copper-exchanged ZSM-5 zeolite having 65% crystallinity in working example 1 (see FIG. 2) is used as gas adsorbent 5 in FIG. 7.

Vacuum thermal insulation material 1 is manufactured by reducing the internal pressure of vacuum thermal insulation material 1 to approximately 10 Pa, and a heat resistance test (an accelerated test in a high temperature environment) is conducted.

When the gas adsorbent in working example 1 is used, gas that enters the inside of outer coating 2 with time is adsorbed, and therefore temporal changes in pressure inside vacuum thermal insulation material 1 are reduced to $\frac{1}{10}$ or less of that in vacuum thermal insulation material 1 including moisture adsorbent 4 only. Accordingly, it is verified that changes in thermal conductivity of vacuum thermal insulation material 1 are reduced and the thermal insulation properties can be maintained at a level equivalent to the original thermal insulation properties for a period of 50 years or so at ordinary temperature.

Working Example 4

As in working example 3, vacuum thermal insulation material 1 is manufactured, and a moisture resistance test (an accelerated test in a high humidity environment) is conducted.

When the gas adsorbent in working example 1 is used, gas that enters the inside of outer coating 2 with time is adsorbed, and therefore temporal changes in pressure inside vacuum thermal insulation material 1 are reduced to $\frac{1}{5}$ or less of that in vacuum thermal insulation material 1 including moisture adsorbent 4 only. Accordingly, it is verified that changes in thermal conductivity of vacuum thermal insulation material 1 are reduced.

The reason why the rate of decrease in the internal pressure is lower in the high humidity environment than in the high temperature environment is considered to be due to gas adsorbent 5 according to the present exemplary embodiment being very active with respect to especially nitrogen, meaning that the entering gas contains an increased percentage of moisture and a decreased percentage of nitrogen in the high humidity environment.

Comparison Example 1

A Ba—Li alloy is used as the gas adsorbent, and as in working example 3, the heat resistance test is conducted.

Since the adsorption properties are insufficient, changes in the pressure are reduced to only approximately ½ of that in the vacuum thermal insulation material including the moisture adsorbent only.

Comparison Example 2

A gas adsorbent that is the same as or similar to that in comparison example 1 is used, and as in working example 4, the moisture resistance test is conducted.

Since the adsorption properties are insufficient, changes in the pressure are reduced to only approximately ⅔ of that in the vacuum thermal insulation material including the moisture adsorbent only.

INDUSTRIAL APPLICABILITY

As described above, the present invention provides a gas adsorbent that is environmentally friendly without containing the substances designated by the PRTR and has an equal or superior ability to adsorb a large volume of gas in a pressure range not higher than atmospheric pressure compared to an existing product. Furthermore, the present invention provides a gas adsorbent that can adsorb nitrogen, oxygen, hydrogen, water, carbon monoxide, and the like and is applicable to various fields including removal of gas in a fluorescent lamp, removal of trace gas in noble gas, and gas separation. In addition, the present invention provides a vacuum thermal insulation material that can maintain thermal insulation properties over a long period of time. Thus, the present invention can be used for a building or the like which calls for thermal insulation properties that last very long. Furthermore, the present invention can also be used for a cooling and insulation device such as a refrigerator and a heating and insulation device such as an electric kettle, a rice cooker, a slow cooker, or a water heater, and can exert a great power saving effect over a long period of time. Furthermore, the present invention is applicable to office equipment such as a laptop computer, a copier, a printer, or a projector which calls for high thermal insulation properties while saving space. In addition, the present invention can also be applied to a container box or used in an application in which cooling and insulation are needed such as a cooler.

REFERENCE MARKS IN THE DRAWINGS 1 vacuum thermal insulation material
2 outer coating
3 core
4 moisture adsorbent
5 gas adsorbent

The invention claimed is:

1. A gas adsorbent, comprising copper-exchanged ZSM-5 zeolite, wherein:
crystallinity of the copper-exchanged ZSM-5 zeolite is set to at least 40% and up to 80%, and
the copper-exchanged ZSM-5 zeolite has a Si/Al ratio of at least 10 and up to 20.

2. The gas adsorbent according to claim 1, wherein the crystallinity of the copper-exchanged ZSM-5 zeolite is set to at least 50% and up to 75%.

3. The gas adsorbent according to claim 1, wherein the crystallinity of the copper-exchanged ZSM-5 zeolite is calculated using a ratio of peak intensity of the copper-exchanged ZSM-5 zeolite to peak intensity of Na—, H—, or NH4-ZSM-5 zeolite having a Si/Al ratio substantially equal to a Si/Al ratio of the copper-exchanged ZSM-5 zeolite, where the peak intensity of Na—, H—, or NH4-ZSM-5 zeolite having the Si/Al ratio substantially equal to the Si/Al ratio of the copper-exchanged ZSM-5 zeolite is defined as 100%, the peak intensity being intensity of a peak having highest intensity among peaks detected at $2\theta=22.8°$ to $23.8°$ in X-ray diffraction of each of the copper-exchanged ZSM-5 zeolite and the Na—, H—, or NH4-ZSM-5 zeolite having the Si/Al ratio substantially equal to the Si/Al ratio of the copper-exchanged ZSM-5 zeolite.

4. The gas adsorbent according to claim 3, wherein the copper-exchanged ZSM-5 zeolite has a copper exchange rate of at least 130% and less than 200%.

5. A vacuum thermal insulation material, comprising:
at least an outer coating;
a core; and
a gas adsorbent, wherein
as the gas adsorbent, the gas adsorbent claim 4 is used.

6. A vacuum thermal insulation material, comprising:
at least an outer coating;
a core; and
a gas adsorbent, wherein
as the gas adsorbent, the gas adsorbent claim 3 is used.

7. The gas adsorbent according to claim 1, wherein the copper-exchanged ZSM-5 zeolite has a copper exchange rate of at least 130% and less than 200%.

8. A vacuum thermal insulation material, comprising:
at least an outer coating;
a core; and
a gas adsorbent, wherein
as the gas adsorbent, the gas adsorbent claim 7 is used.

9. The gas adsorbent according to claim 1, wherein the Si/Al ratio of a surface portion of the copper-exchanged ZSM-5 zeolite is smaller than the Si/Al ratio of portions other than the surface portion of the copper-exchanged ZSM-5 zeolite.

10. A vacuum thermal insulation material, comprising:
at least an outer coating;
a core; and
a gas adsorbent, wherein
as the gas adsorbent, the gas adsorbent according to claim 1 is used.

* * * * *